United States Patent
Garth

(10) Patent No.: US 9,837,762 B2
(45) Date of Patent: Dec. 5, 2017

(54) PLUG CONNECTOR PART WITH A LATCHING ELEMENT

(71) Applicant: Phoenix Contact E-Mobility GmbH, Schieder-Schwalenberg (DE)

(72) Inventor: Carsten Garth, Lemgo (DE)

(73) Assignee: PHOENIX CONTACT E-MOBILITY GMBH, Schieder-Schwalenberg (DE)

( * ) Notice: Subject to any disclaimer, the term of this patent is extended or adjusted under 35 U.S.C. 154(b) by 0 days.

(21) Appl. No.: 15/118,904

(22) PCT Filed: Feb. 16, 2015

(86) PCT No.: PCT/EP2015/053198
§ 371 (c)(1),
(2) Date: Aug. 15, 2016

(87) PCT Pub. No.: WO2015/124522
PCT Pub. Date: Aug. 27, 2015

(65) Prior Publication Data
US 2017/0047679 A1 Feb. 16, 2017

(30) Foreign Application Priority Data
Feb. 20, 2014 (DE) .......................... 10 2014 102 197

(51) Int. Cl.
*H01R 13/62* (2006.01)
*H01R 13/627* (2006.01)
(Continued)

(52) U.S. Cl.
CPC ...... *H01R 13/6275* (2013.01); *B60L 11/1818* (2013.01); *H01R 13/6397* (2013.01); *B60L 2230/12* (2013.01); *H01R 2201/26* (2013.01)

(58) Field of Classification Search
CPC ........................... H01R 11/30; H01R 13/6205
(Continued)

(56) References Cited

U.S. PATENT DOCUMENTS 5,639,256 A 6/1997 Endo et al.
5,751,135 A 5/1998 Fukushima et al.
(Continued)

FOREIGN PATENT DOCUMENTS

DE 19509336 C2 9/1995
DE 19649707 C2 6/1997
(Continued)

*Primary Examiner* — Phuong Dinh
(74) *Attorney, Agent, or Firm* — Leydig, Voit & Mayer, Ltd.

(57) ABSTRACT

A plug connector part for a plug connector includes a housing part; a plug portion arranged on the housing part for plug-connection to another plug connector part; and a latching element, which is arranged in a movable manner on the housing part, including a latching portion for locking to the other plug connector part, the latching element being movable between a first, locking position for establishing locking between the plug connector part and the other plug connector part and a second, unlocking position for unlocking the plug connector part from the other plug connector part. A handle is arranged on the housing part, and has a handle piece with a securing element arranged on the handle piece so as to be movable in a securing direction to act on the latching element in a securing position to prevent the latching element from moving out of the first, locking position.

14 Claims, 4 Drawing Sheets

(51) Int. Cl.
*B60L 11/18* (2006.01)
*H01R 13/639* (2006.01)

(58) Field of Classification Search
USPC .......................................... 439/305, 304, 352
See application file for complete search history.

(56) References Cited

U.S. PATENT DOCUMENTS

| | | |
|---|---|---|
| 8,206,171 B2 | 6/2012 | Osawa et al. |
| 8,573,994 B2 | 11/2013 | Kiko et al. |
| 2011/0034053 A1 | 2/2011 | Matsumoto et al. |
| 2011/0281447 A1* | 11/2011 | Kano .................. B60L 11/1818 439/133 |
| 2013/0078835 A1 | 3/2013 | Gunreben et al. |
| 2014/0106586 A1 | 4/2014 | Boeck et al. |

FOREIGN PATENT DOCUMENTS

| | | |
|---|---|---|
| DE | 102006003613 A1 | 8/2007 |
| DE | 102009044179 A1 | 12/2010 |
| DE | 102011002024 A1 | 10/2012 |
| EP | 2352208 A1 | 8/2011 |
| WO | WO 2013035240 A1 | 3/2013 |
| WO | WO 2013176137 A1 | 11/2013 |

* cited by examiner

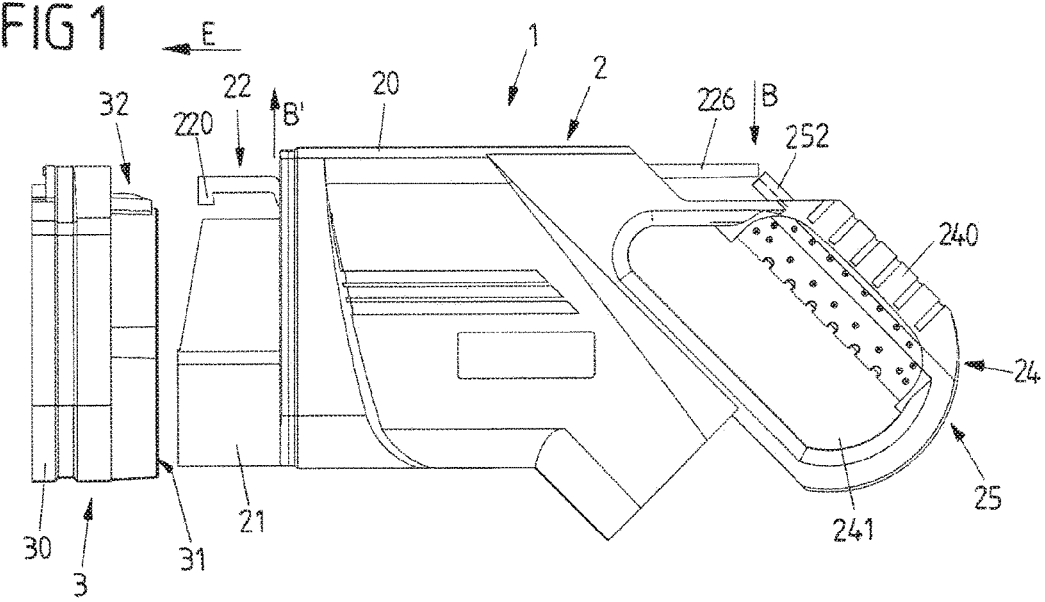
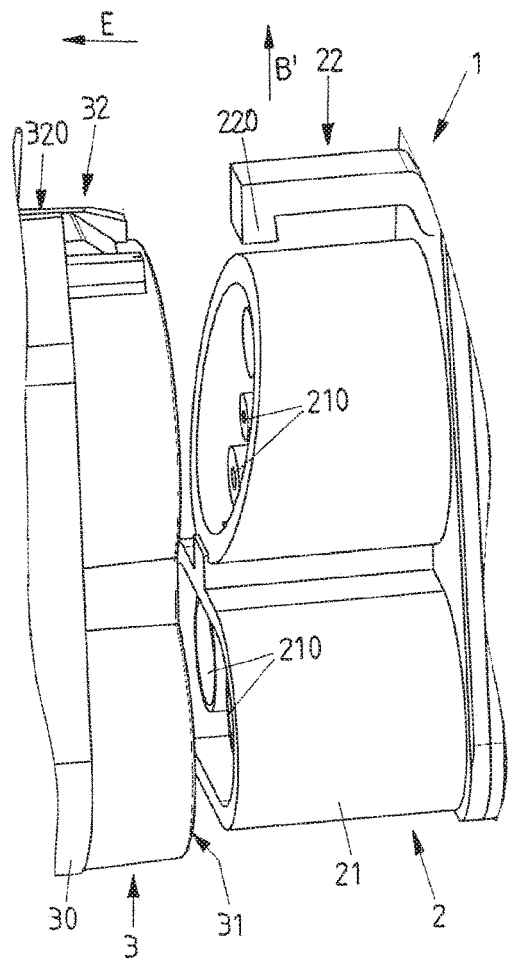

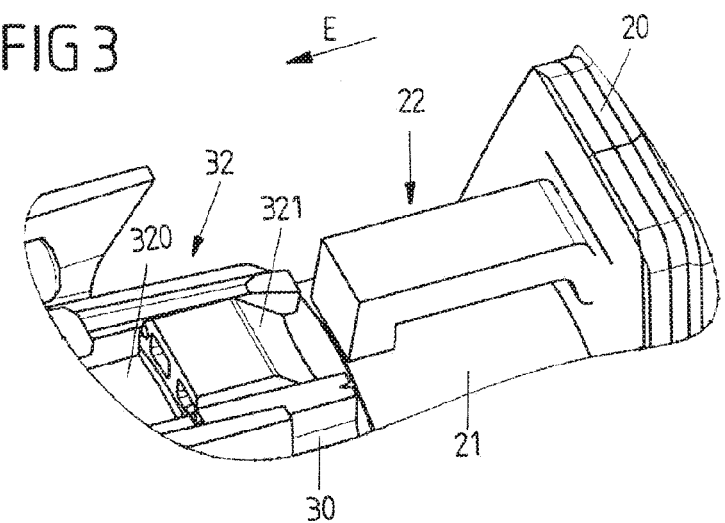
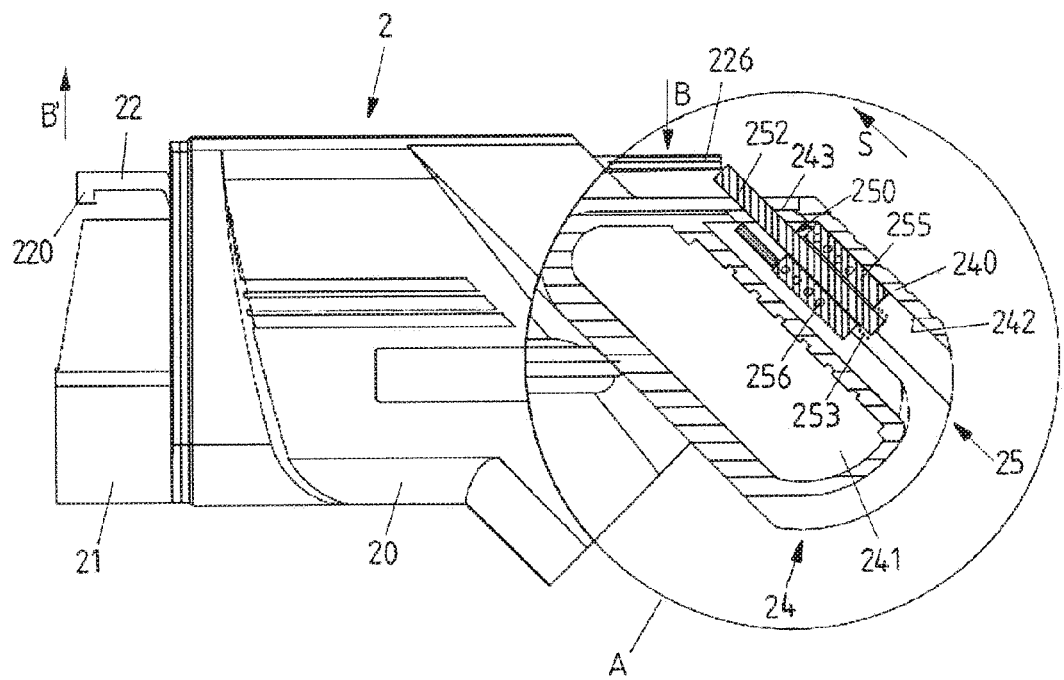

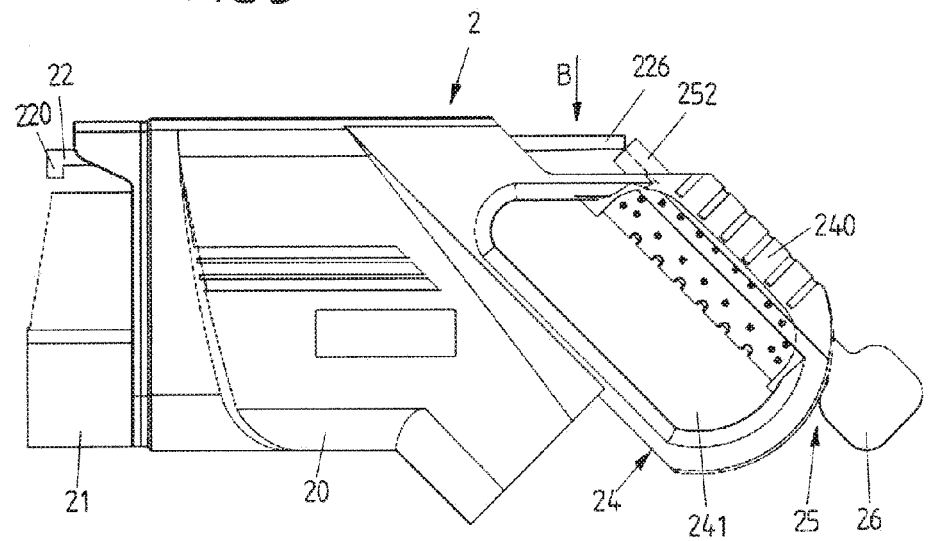
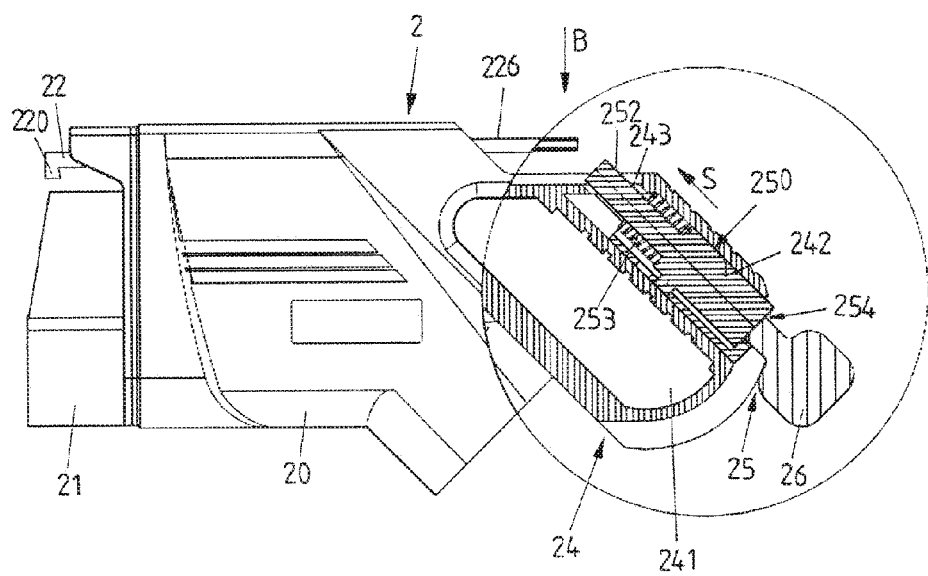

PLUG CONNECTOR PART WITH A LATCHING ELEMENT

CROSS-REFERENCE TO PRIOR APPLICATIONS

This application is a U.S. National Phase application under 35 U.S.C. §371 of International Application No. PCT/EP2015/053198, filed on Feb. 16, 2015, and claims benefit to German Patent Application No. DE 10 2014 102 197.5, filed on Feb. 20, 2014. The International Application was published in German on Aug. 27, 2015 as WO 2015/124522 A1 under PCT Article 21(2).

FIELD

The invention relates to a plug connector part for a plug connector.

BACKGROUND

Such a plug connector part comprises a housing part, a plug portion, which is arranged on the housing part, for plug-connection to another plug connector part, and a latching element which is arranged in a movable manner on the housing part and has a latching portion for locking to the other plug connector part. The latching element can be moved between a first, locking position for establishing locking between the plug connector part and the other plug connector part, and a second, unlocking position for unlocking the plug connector part from the other plug connector part. A handle for a user to grip the plug connector part is arranged on the housing part. The handle has a handle piece which can be gripped by a user.

Such a plug connector part in the form of a charging plug is known, for example from DE 196 49 707 C2. The charging plug comprises a latching element in the form of a latching lever, which is designed to lock the charging plug to the charging socket in the case of a charging plug that is plugged into a charging socket. To release the locking between the charging plug and the charging socket, the latching lever can be pivoted in order to disengage a latching portion of the latching lever from an associated latching receiver of the charging socket in this manner such that the charging plug can be pulled out of the charging socket.

Other charging plugs having a latching element in the form of a latching lever are known, for example from DE 10 2011 002 024 A1, U.S. Pat. Nos. 8,206,171 B2, 8,573,994 B2 and WO 2013/035 240 A1.

By providing such a latching element, for example in the case of a plug connector part in the form of a charging plug, reliable locking of the plug connector parts can be achieved in a state in which it is plugged into another plug connector part, for example a charging socket, such that the plug connector part cannot easily be removed from the other plug connector part, or not without releasing the locking anyway. As the result of such locking, a charging plug can be secured, for example during a charging procedure. Moreover, the locking can also ensure a secure hold and secure storage of the charging plug outside of a charging procedure in a storage position of the charging plug, in which the charging plug, for example, is plugged into a receiver provided therefor at a charging point or near a charging point.

A charging procedure for charging an electric vehicle lasts a comparatively long time these days, for example up to 8 hours. In such a charging procedure, a plug connector part in the form of a charging plug, for example, is plugged into an associated charging socket of the electric vehicle at a charging point, the charging process frequently being unsupervised for the duration of the charging, in particular in the case of public charging points. In the process, it should be prevented that a charging procedure could be undesirably interrupted by a third party by pulling the charging plug out of the charging socket. It should also be ruled out that an unauthorized third party removes a charging plug from an electric vehicle and connects it to another electric vehicle and in the process, the electricity charges and charging fees are still billed to a first, authorized user.

In order to make unauthorized removal of a charging plug from an electric vehicle impossible, some charging plugs provide the option of attaching a padlock, by means of which the latching element locking the charging plug to the charging socket can be obstructed. If a user attaches a padlock to the charging plug, the locking between the charging plug and the charging socket cannot be released and therefore the charging plug cannot be removed from the charging socket. In order to secure a charging plug by means of a padlock, however, it is always necessary in this case for a user to also carry a padlock with them, which is not always guaranteed and can also be impractical for a user. Moreover, it can occur that such a padlock freezes on a charging plug in cold weather conditions, which can make it harder or even impossible to release the charging plug. Moreover, a padlock requires a drilled hole in the housing in order to be attached, which can lead to leaks in the housing.

SUMMARY

A plug connector part for a plug connector includes a housing part; a plug portion arranged on the housing part for plug-connection to another plug connector part; and a latching element, which is arranged in a movable manner on the housing part, including a latching portion for locking to the other plug connector part, the latching element being movable between a first, locking position for establishing locking between the plug connector part and the other plug connector part and a second, unlocking position for unlocking the plug connector part from the other plug connector part. A handle is arranged on the housing part, the handle having a handle piece with a securing element that is arranged on the handle piece so as to be movable in a securing direction to act on the latching element in a securing position to prevent the latching element from moving out of the first, locking position into the second, unlocking position, and, in a released position to release the latching element for movement out of the first, locking position into the second, unlocking position.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 1 is a side view of a plug connector having two plug connector parts in the form of a charging plug and a charging socket, which can be plug-connected to one together;

FIG. 2 is a view of a plug connector, which is enlarged in sections, according to FIG. 1 in a position before establishing a locking between the plug connector parts;

FIG. 3 is another view of the plug connector, which is enlarged in sections, according to FIG. 1 in a position before establishing locking between the plug connector parts;

FIG. 4 is a side view of the plug connector part in the form of a charging plug, cut away in a section A;

FIG. 5 is a side view of another embodiment of a plug connector part having a handle piece and a securing element arranged thereon;

FIG. 6 is a partially cut-away view of the plug connector part according to FIG. 5.

DETAILED DESCRIPTION

Figure 7:
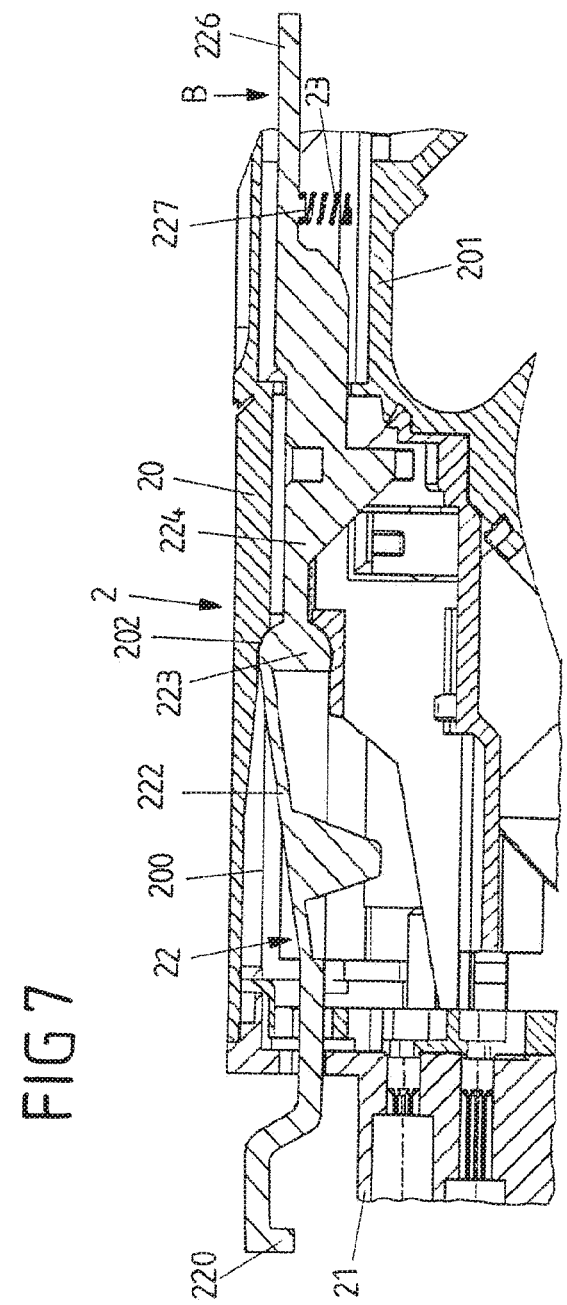
FIG. 7 is a sectional cutaway view through a charging plug having a latching element arranged thereon for locking the plug connector part.

In an embodiment, the present invention provides a plug connector part, for example in the form of a charging plug, which allows for securing in a state in which it is plugged into another plug connector part, for example a charging socket, in a simple manner such that an unauthorized third party cannot easily remove the plug connector part from the other plug connector part.

A securing element, which is arranged on the handle piece so as to be movable in a securing direction, is additionally provided, and is designed to act on the latching element in a securing position in order to prevent the latching element from moving out of the first, locking position into the second, unlocking position and, in a release position, to release the latching element for movement out of the first, locking position into the second, unlocking position.

The present invention is based on the idea of providing an additional securing element, which can interact in a blocking manner with the latching element, such that the latching element cannot be moved out of its first, locking position when the securing element is blocking the latching element. If the plug connector part, for example a charging plug, is plugged into an associated other plug connector part, for example a charging socket, and locked to the other plug connector part by means of the latching element, then an unauthorized third party cannot easily release the locking when the securing element is in its securing position and thus is blocking the latching element in its first, locking position. Only when the securing element has been moved out of its securing position into the release position and therefore the latching element is released can the latching element be moved out of its first, locking position and moved into the second, unlocking position such that the plug connector part can be unlocked and therefore removed from the associated other plug connector part.

The securing element is arranged on the handle piece of the plug connector part in a movable manner and can be moved in a securing direction relative to the handle piece, in particular being longitudinally displaceable relative to the handle piece in the securing direction. Because the securing element is arranged on the handle piece in a movable manner, installation space is used that is available anyway and is not occupied by other components of the plug connector part. The securing element is therefore placed in a region, in which installation space is available that is not used in conventional plug connector parts, such that the securing element does not require any additional installation space, and in particular does not contribute to an increase in the installation space for the plug connector part.

The latching element is advantageously designed as a latching lever which is pivotally mounted on a housing part. Such a latching lever is, for example, pivotally mounted on the housing part by means of a bearing element and preferably has a first lever arm bearing the latching portion and a second lever arm which is different to the first lever arm. To move the latching element from its first, locking position into the second, unlocking position, the latching element in the form of the latching lever can be pivoted relative to the housing part, in order, in the case of connected plug connector parts, to raise the latching portion on the first lever arm of the latching element out of an associated latching receiver of the other plug connector part and in this manner to release the locking between the plug connector parts.

On an end of the latching element facing away from the latching portion, the latching element preferably bears an operating portion, which is arranged on the second lever arm and by means of which the latching element can be operated for movement out of the first, locking position into the second, unlocking position. A user can act on the operating portion manually in order to operate the latching element and to move it out of its first, locking position into the second, unlocking position. Because the operating portion is arranged on an end of the second lever arm facing away from the bearing element, advantageous leverage ratios for operating the latching element arise, in particular for unlocking out of the first, locking position.

In its securing position, the securing element is preferably moved closer to the operating portion of the latching element and is arranged relative to the operating portion such that the operating portion cannot be moved past the securing element toward the second, unlocking position. In its securing position, the securing element therefore acts on one end of the second lever arm of the latching element formed as the latching lever (or at least is located at a small distance away therefrom) and as a result, blocks the latching element such that it cannot be moved out of the first, locking position into the second, unlocking position. In order to release the latching element, the securing element can be moved in the securing direction and thereby away from the operating portion of the latching element such that a movement segment, along which the operating portion is to be moved for unlocking the latching element, is freed up and therefore the latching element can be moved out of its first, locking position into the second, unlocking position.

The securing element is preferably guided in a movable manner in a drilled hole in the handle piece extending longitudinally in the securing direction. In this case, the securing element can, for example, comprise a body, by means of which the securing element slides inside the drilled hole in a guided manner and to which an elongate tappet is attached, which tappet can be moved closer to the latching element to block it by moving the securing element. In its securing position, the securing element then blocks the latching element by means of the tappet such that the latching element cannot be operated for unlocking the connection between the plug connector parts.

In one embodiment, a spring element is provided, which acts between the securing element and a wall of the handle piece in a pre-tensioning manner and pre-tensions the securing element toward the release position relative to the handle piece. The spring element can, for example, be arranged on the tappet of the securing element and can encompass it. For example, the spring element is designed as a pneumatic spring, which is tensioned under pressure during the movement of the securing element into its securing position. The return of the securing element into the release position can then occur as automatically as possible in a spring-force-assisted manner.

Preferably, the securing element can be locked relative to the handle piece and is therefore lockable in its position. To this end, a mechanical lock, for example, can be provided which can be locked and unlocked again by means of a key. In this manner, it can be ensured that only an authorized user can move the securing element out of its securing position namely by unlocking the securing element using their key and then moving it out of its securing position into the release position. Only then can the latching element be operated for unlocking the connection between the plug connector parts and for releasing the plug connector parts from one another. In this manner, a charging plug, for example, can only be removed from a charging point or removed from a vehicle by an authorized user, namely only by a user who has a key for unlocking the securing device.

As mentioned, the securing element can be spring pre-tensioned toward the release position by means of a suitable spring element. Additionally or alternatively, it is, however, also feasible and possible for the securing element to be adjusted by means of a suitable drive device using an electrical, electromagnetic or mechanical actuator which acts on the securing element in order to move the securing element. The movement of the securing element can therefore occur in a power-operated manner, it being possible to actuate the securing element, for example, at the start of a charging procedure in order to move it into its securing position and to move it at the end of a charging procedure back into its release position by means of an actuator, so that the latching element is released and the plug connector part can therefore be removed from the other plug connector part.

Such an actuator can, for example, be formed by an electric lifting magnet, which comprises a stator arranged on the handle piece and an electrical coil arranged on the stator. In order to move the securing element, the electrical coil can be energized in order to move the securing element, portions of which are, for example, made of a suitable ferromagnetic material, inside the stator. In this case, displacement of the securing element by energizing the electric lifting magnet can, for example, occur toward the securing position, while the securing element is spring pre-tensioned toward the release position and therefore a return to the release position occurs automatically under the effect of the spring force when the coil is not energized.

FIG. 1 is a side view of a plug connector 1, which comprises a first plug connector part 2 in the form of a charging plug and a second plug connector part 3 in the form of a charging socket associated with the charging plug.

The plug connector 1 can, for example, be used on an electric vehicle for electrically charging the vehicle. For this purpose, contact openings 210 having electric contacts arranged therein are provided on a plug portion 21 of the first plug connector part 2, which plug connector is to be inserted into a plug receiver 31 of the second plug connector part 3 in order to connect the plug connector parts 2, 3. The electric contacts come into electrical contact with associated electric contacts in the plug receiver 31 of the second plug connector part 3 when the first plug connector part 2 is inserted into the second plug connector part 3, such that charging currents for charging the vehicle can flow via the plug connector 1.

The first plug connector part 2 comprises a housing part 20, which constitutes a housing of the first plug connector part 2 and to which the plug portion 21 connects. The second plug connector part 3 comprises a housing 30, which surrounds the edge of the plug receiver 31. To connect the plug connector parts 2, 3, the plug portion 21 can be inserted into the plug receiver 31 in a substantially form-fitting manner such that, in the plugged-in state, the plug connector parts 2, 3 are plug-connected to one another.

On the first plug connector part 2, a latching element 22 in the form of a latching lever, which is pivotally mounted on the housing part 20, is arranged, and bears a latching portion 220 on an end facing the second plug connector part 3 upon insertion, which latching portion, as shown in the enlarged views in FIGS. 2 and 3, moves onto a bevel 321 of a latching receiver 32, which forms a recess 320, on the housing 30 of the second plug connector part 3 upon plugging the first plug connector part 2 to the second plug connector part 3, and thus raises the latching element 22, together with the latching portion 220 arranged therein, such that the latching portion 220 can slide over the bevel 321 and dip into the recess 320 in a latching manner.

When the plug portion 21 is fully inserted into the plug receiver 31, the latching portion 220 is inserted in the latching receiver 32 of the second plug connector part 3 in a locking manner such that the first plug connector part 2 is locked to the second plug connector part 3 counter to an insertion direction E, in which direction the first plug connector part 2 is to be inserted into the second plug connector part 3.

The latching element 22 is pivotally mounted on the housing 20 of the plug connector part 2. The latching element 22 is encompassed by the housing 20 to the greatest possible extent and extends out of the housing 20 by the latching element 220 at one end and by an operating portion 226 on an end of the latching element 22 facing away from the latching portion 220 at the other end. The latching element 22 can be operated by means of the operating portion 226 to release the locking between the plug connector parts 2, 3. For this purpose a user can, for example, press manually on the operating portion 226 in an operating direction B, as a result of which the latching element 22 is pivoted relative to the housing 22 and the latching portion is raised in an operating direction B' such that it disengages from the latching receiver 32.

The latching element 22 is preferably pre-tensioned by a spring mechanism in its locking position by a suitable spring such that after it has been operated, the latching element 22 automatically returns to the locking position (FIG. 1), as is shown in an embodiment in FIG. 7 and is yet to be described below.

In the connected state, the plug connector part 2 in the form of the charging plug is connected to the associated other plug connector part 3 in the form of the charging socket and is locked to the other plug connector part 3 by the latching element 22 which engages in the latching receiver 32 by its latching portion 220.

In order to prevent the latching element 22 for unlocking the connection between the plug connector parts 2, 3 from being able to be operated by an unauthorized third party in this case, a securing device 25 having a securing element 250 in the form of an elongate tappet 252, which is movable longitudinally in a securing direction S, is provided in the case of the embodiment according to FIGS. 1 to 4, which securing element, when in a securing position, blocks an operation of the latching element 22 out of its first, locking position (FIG. 4) and only releases the latching lever 22 after movement into a release position such that said lever can be moved into its second, unlocking position.

The securing device 25 is provided on a handle 24 of the plug connector part 2. The handle is substantially formed by a handle piece 240, which a user can hold to grip the plug connector part 2 by putting their finger through a handle opening 241 in the handle 24 and thus placing it around the handle piece 240.

In the embodiment according to FIGS. 1 to 4, the securing device 25 is designed having an actuator in the form of an electric lifting magnet. The actuator comprises a stator 255, which is immovably arranged inside a drilled hole 242 in the form of a hollow space inside the handle piece 240 and an electrical coil 256. The coil 256 is wound in a winding direction around the securing direction S and the securing element 250 in the form of the tappet 252 passes through said coil along its coiling axis, which is collinear to the securing direction S, such that the securing element 250 can be moved in the securing direction S relative to the stator 255.

Portions of the securing element 250 are, for example, made of a ferromagnetic material and said element therefore enters into magnetic interaction with a magnetic field produced by the coil 256 when the coil 256 is energized. When the coil 256 is energized, the tappet 252 of the securing element 250 is moved in the securing direction S relative to the stator 255 such that the tappet 252 is moved closer to the operating portion 226 of the latching element 22, as shown in FIG. 4. The latching element 22 is therefore secured against operation and, in particular, cannot be moved in the operating direction B.

The securing element 250 in the form of the tappet 252 is pre-tensioned by a spring mechanism by means of a spring element 253 relative to the stator 255 toward the release position. If the electrical coil 256 is not energized (any more) then the securing element 250 automatically moves counter to the securing direction S into the release position due to the pre-tensioning force from the spring mechanism of the spring 253 and is thus moved away from the operating portion 226 such that the latching element 22 is released and can be operated to release the locking.

The securing element 250 can, for example, be moved in a controlled manner, for example depending on the progress of a charging procedure. At the beginning of a charging procedure, for example, the securing element 250 can automatically be moved into its securing position by the drive of the actuator such that the plug connector part 2 is blocked. If a charging procedure has finished, the securing element 250 can be moved in a controlled manner out of its securing position into the release position in order to unblock the plug connector part 2 and thus allow removal of the plug connector part 2 from the other plug connector part 3.

It is also feasible for the securing element 250 to be shifted in a controlled manner by a user, for example in that a user generates an appropriate control signal using a remote control or an appropriate electronic signaling device and transmits said signal to the actuator to shift the securing element 250.

In an embodiment according to FIGS. 5 and 6, a securing device 25 is provided with a securing element 250 that is guided in the drilled hole 242 in the handle piece 240 of the handle 24 of the plug connector part 2 and is to be operated manually. In this case, the securing element 250 is guided so as to be able to move longitudinally in the securing direction S in the drilled hole 242 in the form of a hollow space inside the handle piece 240. The securing element 250 comprises a body 251, which is slidingly arranged inside the drilled hole 242 and to which a tappet 252 is connected longitudinally in the securing direction S. The tappet 252 is guided out of the handle piece 240 through an opening 243 at the top and is moved closer to the operating portion 226 of the latching element 22 when the securing element 250 is in the securing position (see FIG. 5), in order to block a movement of the operating portion 226 of the latching element 22 in the operating direction B.

By moving the securing element 250 inside the drilled hole 242 counter to the securing direction S, the tappet 252 can be moved away from the operating portion 226 such that movement of the operating portion 226 is allowed and the latching element 22 can be moved out of its first, locking position into the second, unlocking position.

A spring element 253 in the form of a pneumatic spring is arranged on the tappet 252, which pneumatic spring pre-tensions the securing element 250 relative to the walls of the handle piece 240 which belong to the housing part 20. In this case, the pre-tensioning provided by the spring element 253 acts toward the release position such that the spring element 253 is tensioned under pressure when moving the securing element 250 into the securing position and a return of the securing element 250 into the release position is assisted by its spring force.

The securing element 250 can be locked in its securing position such that the securing element 250 is locked in place in its securing position. This locking in place can only be released by means of a key 26, by means of which a lock 254 provided on the body 251 of the securing element 250 can be opened in order to allow the securing element 250 to move out of the securing position counter the securing direction S, in order to release the latching element 22.

In order to release the securing of the plug connector part 2, a user must therefore have a key 26, by means of which they can release the locking in place of the securing element 250 and therefore unblock the latching element 22. An unauthorized third party, who does not have a key 26, cannot unblock the plug connector part 2 and therefore cannot release the locking of the connection between the plug connector parts 2, 3. It is impossible for them to operate the latching element 22.

The securing element 250 does not, however, necessarily have to be operated manually by a user by using a key 26 in this embodiment either. It is, for example, also feasible for an actuator, for example an electrical, electromagnetic or mechanical actuator, to be provided in order to move the securing element 250 between its securing position and its release position.

In the embodiments described, the securing direction S corresponds to the direction of the longitudinal extension of the handle piece 240 and is aligned obliquely at an angle to the operating direction B. In this case it is, however, also feasible for the securing direction S to be aligned in parallel with or transverse to the operating direction B.

FIG. 7 is a longitudinal sectional cutaway view along a sectional plane stretching through the insertion direction E and the operating direction B of an embodiment of a pivotable arrangement of the latching element 22 in the housing part 20 of the first connector part 1, as can be used in the embodiments described above. The latching element 22 in the form of the latching lever extends in an inner space 200 of the housing part 20 and comprises a bearing element 223, which is spherical at least in portions and is inserted in a bearing receiver 202 of the housing part 20 such that the latching element 22 can be pivoted at least over a certain pivoting range relative to the housing part 20.

A first lever arm 222, which bears the latching portion 220 at its end facing away from the bearing element 223, connects to the bearing element 223. In the opposite direction, a second lever arm 224 extends from the bearing element 223 and bears the operating portion 226 on its end facing away from the bearing element 223, by means of which operating portion a user can manually act on the latching element 22 in order to operate the latching element 22 to unlock the plug connector parts 2, 3 from one another.

In the region of this end of the second lever arm 224, the force of a spring element 23 also acts on a bracket 227, by means of which spring element the latching element 22 is pre-tensioned under pressure relative to a wall 201 of the housing part 20. In this case, the spring element 23 acts counter to the operating direction B, in which a user has to operate the latching element 22 in order to move the latching element 22 out of a first, locking position, in which the first plug connector part 2 is locked to the second plug connector part 3 when the plug connector parts 2, 3 are plugged into one another, into a second, unlocking position, in which the locking is released.

Due to the spring pre-tensioning, the locking between the plug connector parts 2, 3 is established automatically upon plugging the plug connector part 2 to the second plug connector part 3. The latching portion 220 therefore automatically snaps into the associated latching receiver 32 upon plugging the first plug connector part 2 to the second plug connector part 3.

The idea on which the invention is based is not restricted to the embodiments described above, but can also in principle be realized by entirely different kinds of embodiments.

In particular, the present invention is not necessarily restricted to plug connectors in the form of charging devices for charging electric vehicles, but can also be used in an expedient manner in the case of other plug connectors for securing a locking.

The securing element does not necessarily have to be arranged on the handle body such that it can be moved longitudinally but, in principle, can also be pivotally mounted on the handle body. It is only essential in this connection that the securing element can be moved relative to the handle body in order to secure and release the latching element.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Plug connector
2 Plug connector part
20 Housing part
200 Space
201 Wall
202 Bearing receiver
21 Plug portion
210 Contact openings
22 Latching element
220 Latching portion
222 Lever arm
223 Bearing element
224 Lever arm
226 Operating portion
227 Bracket
23 Spring element
24 Handle
240 Handle piece
241 Handle opening
242 Drilled hole
243 Opening
25 Securing device
250 Securing element
251 Body
252 Tappet
253 Spring element
254 Lock
255 Stator
256 Coil
26 Key
3 Plug connector part
30 Housing
31 Plug receiver
32 Latching receiver
320 Recess
321 Bevel
A Cutout
B, B' Operating direction
E Insertion direction
S Securing direction

The invention claimed is:

1. A plug connector part for a plug connector, comprising:
a housing part;
a plug portion arranged on the housing part configured for plug-connection to another plug connector part;
a latching element, which is arranged in a movable manner on the housing part, comprising a latching portion configured to lock to the other plug connector part, the latching element being movable between a first, locking position for establishing locking between the plug connector part and the other plug connector part and a second, unlocking position for unlocking the plug connector part from the other plug connector part; and
a handle arranged on the housing part, the handle having a handle piece comprising a securing element that is arranged on the handle piece so as to be movable in a securing direction and is configured to act on the latching element in a securing position to prevent the latching element from moving out of the first, locking position into the second, unlocking position, and, in a released position to release the latching element for movement out of the first, locking position into the second, unlocking position, wherein the securing element is configured to be moved in a drilled hole in the handle piece extending in the securing direction.

2. The plug connector part according to claim 1, wherein the latching element comprises a latching lever which is pivotally mounted on the housing part.

3. The plug connector part according to claim 1, wherein the latching element is pivotally mounted on the housing part by a bearing element.

4. The plug connector part according to claim 1, wherein the latching element comprises a first lever arm bearing the latching portion and a second lever arm which is different to the first lever arm.

5. The plug connector part according to claim 4, wherein the latching element comprises an operating portion arranged on the second lever arm, by which operating portion the latching element is configured to be operated for movement out of the first, locking position into the second, unlocking position.

6. The plug connector part according to claim 5, wherein, in the securing position, the securing element is moved closer to the operating portion and is arranged relative to the operating portion such that the operating portion cannot be moved past the securing element toward the second, unlocking position.

7. The plug connector part according to claim 5, wherein the operating portion is arranged on an end of the latching element facing away from the latching portion.

8. The plug connector part according to claim 1, wherein the securing element comprises a tappet extending longitudinally in the securing direction, by which the securing element is moved closer to the latching element when in the securing position.

9. The plug connector part according to claim 8, wherein a spring element is arranged on the tappet, the spring element being configured to pre-tension the securing element toward the release position.

10. The plug connector part according to claim 1, wherein the securing element is configured to be locked relative to the handle piece and to be unlocked by a key.

11. The plug connector part according to claim 1, further comprising an electromagnetic or mechanical actuator arranged on the handle piece, the actuator being configured to move the securing element relative to the handle piece.

12. The plug connector part according to claim 11, wherein the actuator comprises an electric lifting magnet, which has a stator arranged on the handle piece and an electrical coil arranged on the stator, the electrical coil being configured to be energized to move the securing element.

13. A plug connector part for a plug connector, comprising:
a housing part;
a plug portion arranged on the housing part configured for plug-connection to another plug connector part;
a latching element, which is arranged in a movable manner on the housing part, comprising a latching portion configured to lock to the other plug connector part, the latching element being movable between a first, locking position for establishing locking between the plug connector part and the other plug connector part and a second, unlocking position for unlocking the plug connector part from the other plug connector part; and
a handle arranged on the housing part, the handle having a handle piece comprising a securing element that is arranged on the handle piece so as to be movable in a securing direction and is configured to act on the latching element in a securing position to prevent the latching element from moving out of the first, locking position into the second, unlocking position, and, in a released position to release the latching element for movement out of the first, locking position into the second, unlocking position,
wherein the securing element comprises a tappet extending longitudinally in the securing direction, by which the securing element is moved closer to the latching element when in the securing position, and
wherein a spring element is arranged on the tappet, the spring element being configured to pre-tension the securing element toward the release position.

14. A plug connector part for a plug connector, comprising:
a housing part;
a plug portion arranged on the housing part configured for plug-connection to another plug connector part;
a latching element, which is arranged in a movable manner on the housing part, comprising a latching portion configured to lock to the other plug connector part, the latching element being movable between a first, locking position for establishing locking between the plug connector part and the other plug connector part and a second, unlocking position for unlocking the plug connector part from the other plug connector part;
a handle arranged on the housing part, the handle having a handle piece comprising a securing element that is arranged on the handle piece so as to be movable in a securing direction and is configured to act on the latching element in a securing position to prevent the latching element from moving out of the first, locking position into the second, unlocking position, and, in a released position to release the latching element for movement out of the first, locking position into the second, unlocking position; and
an electromagnetic or mechanical actuator arranged on the handle piece, the actuator being configured to move the securing element relative to the handle piece,
wherein the actuator comprises an electric lifting magnet, which has a stator arranged on the handle piece and an electrical coil arranged on the stator, the electrical coil being configured to be energized to move the securing element.

* * * * *